3,105,790
SULFUR DIOXIDE PRODUCING COMPOSITION AND METHOD OF USING SAME

Domenic L. Bartholomew, Wayland, Mass., assignor to Trancoa Chemical Corporation, Reading, Mass., a corporation of Massachusetts
No Drawing. Filed June 15, 1960, Ser. No. 36,114
7 Claims. (Cl. 167—53)

The present invention relates to a means and method of producing sulfur dioxide. In particular, the present invention relates to a means and method of producing sulfur dioxide in the alimentary tract for controlling bactericidal activities in the flora of the alimentary tract.

The bactericidal and fungicidal effect of sulfur dioxide has long been known. However, its use has been restricted to treatment of bacterial and fungal organisms in the agricultural field and also, more recently in the treatment of bacterial and fungal organisms in topical applications to animal and humans. (See U.S. Patent 1,356,029.)

Heretofore, there has been no known way of introducing sulfur dioxide into the alimentary tract of an animal. It is, therefore, an object of the present invention to provide a means and method of introducing sulfur dioxide into the alimentary tract of animals and in particular into the intestines for therapeutic and aseptic purposes. It is believed that the compositions and methods of this invention are also suited for use in humans; however, the compositions and methods of this invention have not as yet been tested clinically on humans.

Thus the present invention provides a means and method of controlling diarrheas of infectious bacterial origin. The present invention is also useful in providing a method by which intestines may be made aseptic or substantially aseptic prior to surgery wherein the intestines are opened, so that there is a substantial reduction in the possibility of secondary infections in such surgery.

The present invention has also been found to be useful in the destruction of a number of organisms found in the alimentary tract including, E. coli, A. aerogenes, S. paratyphi, penicillin resistant S. aureus, Candida albicans, P. aeruginosa, Proteus vulgaris, Bacillus subtilis, etc.

The invention has also been found to be useful in connection with the treatment of food poisonings such as botulism and ptomaine poisoning and conditions known as diverticulitus.

The present invention provides a means and method wherein two chemicals, reactionable in the presence of water to produce sulfur dioxide are combined in dry form, preferably as a tablet, and are suitably enterically coated, so that when ingested, the tablet will pass through the stomach and disintegrate in the intestines. Penetration of water into the mixture initiates the reaction of these chemicals and liberates a satisfactory and measured quantity of sulfur dioxide which in turn attacks bacteria and fungus.

The present invention, therefore, provides an antibiotic for use in bacterial and mycotic control, a gastro-intestinal antiseptic and acidifier, and an antifermentative compound which may be orally administered. This compound may be locally controlled in gaseous generation, does not have systemic effects, is not sensitizing and is not antigenetic.

The present invention provides an enteric coated tablet having a mixture of a nontoxic, water soluble, sulfur dioxide-generating compound, and a nontoxic, water soluble, solid at room temperature, acid having strong mineral acid characteristics.

A preferred embodiment of the present invention is illustrated in the following example:

Example 1

Five grains of cyclohexylsulfamic acid and 2½ grains of sodium bisulfite in dry granular form are homogenously mixed and formed as a tablet with an enteric coating of an anhydrous alcoholic shellac solution. The shellac solution is applied as a coating having a thickness of approximately .00/mm. uniformly over its entire surface. When introduced into the intestines, the following reaction takes place:

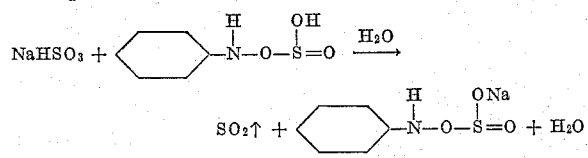

The foregoing example is the preferred embodiment of the invention. The use of cyclohexylsulfamic acid in combination with a sulfite has been found particularly useful because substantially greater amounts of sulfur dioxide may be released by using cyclohexylsulfamic acid which has a pH of approximately 1.3 and has mineral acid characteristics. In addition cyclohexylsulfamic acid is nontoxic, alone, or in combination with sulfite compounds, is solid at room temperature and up to about 100° C., and is water soluble. It has been found that the combination of 5 grains of cyclohexylsulfamic acid and 2½ grains of sodium bisulfite are sufficient to release 100 milligrams of sulfur dioxide gas. This volume of the mixture of acid and bisulfite may be formed as an enteric coated pill sufficiently small enough to be orally administered.

The sulfur dioxide-generating compound must remain nontoxic when dissolved in the alimentary tract. When dissolved it should not form a compound which has a strong physiological reaction. In addition, the sulfite compound should be water soluble, and preferably should not be amphoteric.

Satisfactory sulfur dioxide-genertaing compounds include compounds having sulfite, bisulfite, metasulfite or pyrosulfite radicals.

The positive element of the sulfur dioxide containing compound may include for example, the alkali metals of the group including lithium, sodium and potassium. Alkaline earth metals including calcium and strontium are staisfactory. Beryllium and radium are unsatisfactory as they are toxic. In addition to these enumerated alkali metals and alkaline earth metals, other positive ions such as manganese and magnesium are satisfactory. Iron is unsatisfactory as it is too insoluble while zinc has amphoteric properties which make it relatively unsatisfactory. Ammonium sulfite and ammonium bisulfite may be used.

The following, therefore, is a partial list of satisfactory sulfur dioxide containing compounds.

Sodium sulfite
Calcium sulfite
Manganese sulfite
Strontium sulfite
Sodium bisulfite
Calcium bisulfite
Manganese bisulfite
Strontium bisulfite
Sodium metasulfite
Calcium metasulfite
Manganese metasulfite
Strontium metasulfite
Ammonium sulfite
Potassium sulfite
Magnesium sulfite
Lithium sulfite
Potassium bisulfite Magnesium bisulfite
Lithium bisulfite
Potassium metasulfite
Magnesium metasulfite
Lithium metasulfite
Ammonium bisulfite The acid used in the dry composition must have a solid form at room temperature and up to approximately 100° F. It is particularly important that the acid remain solid at body temperature if it contains water of crystallization. The acid must be nontoxic and water soluble. It must also be nontoxic in reaction with the sulfite compound as well as nontoxic in reactions with body tissues and fluids. The acid must have a strong mineral acid characteristic and should, therefore, have as low a pH as possible. It has been found that cyclohexylsulfamic acid is particularly suited for the purposes of the present invention.

It has also been found that certain acids which are liquid at temperatures below 100° C. may be utilized if initially absorbed in an inert absorbant such as talc, purified siliceous earths or diatomaceous earths. Thus hydrochloric acid may be used. However such absorbed acids have limited effectiveness and do not have the surprisingly satisfactory qualities of cyclohexylsulfamic acid.

Inorganic acids normally must be absorbed in an inert absorbate such as talc. Such acids may include nitric, sulfuric, hydrochloric and phosphoric. Certain acid salts may also be used for limited generation of sulfur dioxide including for example sodium acid phosphate and sodium acid pyrophosphate.

The organic acids having strong mineral acid characteristics are substantially more effective and satisfactory than the inorganic acids. Certain organic acids may be absorbed in talc or other absorbates including formic, acetic and propionic acids. The higher homologues of these acids are satisfactory only for generation of minute quantities of sulfur dioxide.

Certain dicarboxylic acids are satisfactory for limited sulfur dioxide-generation. These include malonic, succinic, glutaric, and adipic acids. Hydroxycarboxylic acids which may be used for limited generation of sulfur dioxide include citric and tartaric acids. Others include lactic, lactic anhydride, and malic acid. Certain amino acids may be used. The preferred amino acids include alpha amino, glycine hydrochloride and glutamic acid hydrochloride and other low molecular weight amino acids commonly found as protein constituents in human protein and in animal and plant proteins.

Certain other aromatic acids have been found to be satisfactory. These include salicylic acid and benzoic acid.

In the mixture, the acid must be in excess of the sulfite, to assure complete generation of sulfur dioxide. Tests heretofore conducted indicate that 100 milligrams of sulfur dioxide may be a standard. The tablets should be made to generate this volume of sulfur dioxide. For such production of sulfur dioxide the following compositions may be used:

*Example 2*

Sodium bisulfite _____ 2½ grains (160 mg.).
Glutamic acid HCl _____ 5 grains (330 mg.).

*Example 3*

Sodium bisulfite _____ 2½ grains (160 mg.).
Sodium biphosphate _____ 6 grains (388 mg.).

*Example 4*

Sodium metabisulfite _____ 3 grains.
Citric acid _____ 6 grains.

*Example 5*

Sodium bisulfite _____ 2½ grains.
HCl in talc 25% trituration _____ 5 grains.

In each of the foregoing examples, the composition is formed as a tablet, coated with an enteric coating so that it will disintegrate in the intestinal tract without generation of sulfur dioxide in the stomach. The enteric coating may comprise either an anhydrous alcoholic solution of shellac, gum sandarac, gum tolu, polyvinylpyrrolidone, or other suitable resinous material.

In the formulation of these tablets, a dry acid is first granulated and dried. The acid granulations should have an approximate size between .5 mm. and 1.5 mm. but preferably 1 mm. The sulfite, bisulfite or metasulfite compound is also similarly granulated, separately from the acid granulation. After drying the sulfite, bisulfite or metasulfite compound, it is mixed with the acid, a lubricant is added, and the mixture is compressed into tablet form. Any lubricant which facilitates the forming of the tablet may be used. Commonly used lubricants include magnesium stearate. Carbowax may also be used as a lubricant. One half to one percent of lubricant to total mixture should be used. This may vary from batch to batch depending upon ambient conditions in accordance with well-known practices in the art.

Separate granulation prevents reaction of the compounds if they inadvertently become wet due to ambient moisture. A sealer coat of an anhydrous alcoholic solution of shellac is first applied to the tablet, with the coat sufficient to seal the tablet surface against moisture. After the tablets are first coated with a sealer coat, a second enteric coating is applied. The thickness of this coating should be such as to prevent disintegration of the tablet in the stomach but to permit its disintegration in the intestines. The second coating may be made of conventional enteric coating materials such as gum sandarac, gum tolu or cetyl alcohol. An additional coating containing flavoring of conventional nature may be applied in a conventional fashion.

These tablets, when introduced into the intestines, will disintegrate in the intestinal fluids. Water in the intestines will cause a reaction with the dry acid and sulfite compound.

What is claimed is:

1. The combination of cyclohexylsulfamic acid and a compound reactionable with said acid and water for use in the generation of sulfur dioxide, said compound having a radical selected from a group of radicals consisting of sulfite, bisulfite, pyrosulfite and metasulfite, and an enteric coat covering said combination.

2. A tablet having a mixture of dry solid cyclohexylsulfamic acid and a nontoxic, solid, dry, water soluble compound reactionable with said acid and water and having an ionizable radical selected from a group consisting of sulfite, bisulfite, pyrosulfite and metasulfite, and an enteric coat covering said mixture, said coat having a thickness normally adapted to permit passage of said tablet through the alimentary canal from the mouth until said tablet reaches the intestines.

3. A tablet having a mixture of a dry, solid, nontoxic, water soluble acid having mineral acid characteristics and a nontoxic compound reactionable with said acid and water in the generation of sulfur dioxide, said compound having an ionizable radical selected from a group consisting of sulfite, bisulfite, pyrosulfite and metasulfite and an enteric coat covering said mixture, said coat having a thickness normally adapted to permit passage of said tablet through the alimentary canal from the mouth until said tablet reaches the intestines.

4. A method of controlling intestinal flora comprising mixing a nontoxic, water soluble, dry solid acid with a nontoxic, water soluble, dry solid compound reactionable with said acid and water to form sulfur dioxide and having a radical selected from the group consisting of sulfite, bisulfite, pyrosulfite and metasulfite, containing said mixture in an enteric coating, introducing said coated mixture through the alimentary tract into the intestines and thereafter allowing said mixture to react with water normally occurring in said intestines.

5. A method of controlling intestinal flora, comprising introducing into intestines a nontoxic acid and a nontoxic compound reactionable with said acid and water to generate sulfur dioxide, said compound having a radical selected from the group consisting of sulfite, bisulfite, pyrosulfite and metasulfite, said acid and compound being enteric coated and allowing said acid and compound to react in the presence of water normally occurring in said intestines.

6. The method of claim 5, wherein said acid is cyclohexylsulfamic.

7. The combination of a nontoxic acid and a nontoxic compound reactionable with said acid and water to generate sulfur dioxide, said compound having a radical selected from the group consisting of sulfite, bisulfite, pyrosulfite and metasulfite, said acid and compound being enteric coated and adapted for use in producing sulfur dioxide in the intestines, thereby controlling intestinal flora.

References Cited in the file of this patent
UNITED STATES PATENTS 2,011,587     Miller _____ Aug. 20, 1935

OTHER REFERENCES

U.S. Dispensatory, 25th ed., 1955, pp. 1371–1372, Lippincott Co., Philadelphia, Pa.

Kendall: Smith's Inorganic Chemistry, 1926, p. 476, The Century Co., New York, N.Y.